United States Patent
Swanepoel

(10) Patent No.: US 12,050,094 B2
(45) Date of Patent: Jul. 30, 2024

(54) ELECTRONIC COUNTERMEASURE CARTRIDGE ARRANGED TO BE LOADED INTO COUNTERMEASURE DISPENSER AND ARRANGED TO IRRADIATE DISPENSED ELECTROMAGNETICALLY REFLECTIVE MATERIAL

(71) Applicant: SAAB AB, Linköping (SE)

(72) Inventor: Albert Swanepoel, Hässelby (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 18/556,475

(22) PCT Filed: Apr. 21, 2022

(86) PCT No.: PCT/SE2022/050386
§ 371 (c)(1),
(2) Date: Oct. 20, 2023

(87) PCT Pub. No.: WO2022/231501
PCT Pub. Date: Nov. 3, 2022

(65) Prior Publication Data
US 2024/0085159 A1 Mar. 14, 2024

(30) Foreign Application Priority Data
Apr. 26, 2021 (SE) .................... 2100067-4

(51) Int. Cl.
*F42B 12/70* (2006.01)
*B64D 1/04* (2006.01)
*F41H 11/02* (2006.01)

(52) U.S. Cl.
CPC ............... *F42B 12/70* (2013.01); *B64D 1/04* (2013.01); *F41H 11/02* (2013.01)

(58) Field of Classification Search
CPC ............. F42B 12/70; B64D 1/04; F41H 11/02
(Continued)

(56) References Cited

U.S. PATENT DOCUMENTS 3,841,219 A 10/1974 Schillreff
5,773,745 A * 6/1998 Widmer .................. F41H 11/02
83/346

(Continued)

FOREIGN PATENT DOCUMENTS

GB 1605446 A * 12/1967 ............. G01S 7/495
JP S63-122978 A 5/1988
(Continued)

OTHER PUBLICATIONS

International Preliminary Examining Autority, International Preliminary Report on Patentability Chapter II, including Applicant's Feb. 23, 2023 Response to the Jun. 2, 2022 Written Opinion, received for International Application No. PCT/SE2022/050386, dated Mar. 31, 2023, 17 pages, Swedish Patent and Registration Office, Sweden.
(Continued)

*Primary Examiner* — Samir Abdosh
(74) *Attorney, Agent, or Firm* — Alston & Bird LLP

(57) ABSTRACT

The disclosure relates to an electronic countermeasure cartridge (6) arranged to be loaded into a countermeasure dispenser (7) in a mobile platform (1). The electronic countermeasure cartridge (6) comprises an electromagnetic transmitting means (8), an electric energy storage (9) arranged to supply the electromagnetic transmitting means (8) with electric energy and a trigger device (10) arranged to trigger a transmission of electromagnetic radiation from the electromagnetic transmitting means (8) upon detection of an incoming threat (2). The transmitted electromagnetic radiation is arranged to irradiate an electromagnetically reflective material (3) dispensed from the countermeasure dispenser (7). The disclosure also relates to a method for providing threat protection for a platform (1) and to a countermeasure system comprising a countermeasure dispenser (7).

20 Claims, 3 Drawing Sheets

(58) Field of Classification Search
USPC .......................................................... 89/1.51
See application file for complete search history.

(56) References Cited

U.S. PATENT DOCUMENTS

| | | | |
|---|---|---|---|
| 8,537,048 B2* | 9/2013 | Dunn | G01S 7/495 |
| | | | 342/14 |
| 2007/0190368 A1* | 8/2007 | Jung | F41H 3/00 |
| | | | 709/224 |
| 2008/0198060 A1 | 8/2008 | Shani et al. | |
| 2016/0146580 A1 | 5/2016 | Tithecott | |
| 2019/0137220 A1 | 5/2019 | Zaetterqvist | |
| 2020/0072582 A1* | 3/2020 | Factor | H01S 5/4012 |
| 2020/0124385 A1* | 4/2020 | Mercier | F42B 12/22 |
| 2023/0400282 A1* | 12/2023 | Kepler | G01S 7/415 |
| 2023/0400551 A1* | 12/2023 | Parker | G08G 5/006 |

FOREIGN PATENT DOCUMENTS

| | | | |
|---|---|---|---|
| JP | 2514939 B2 | 7/1996 | |
| JP | H09-210597 A | 8/1997 | |
| JP | 2000-081298 A | 3/2000 | |

OTHER PUBLICATIONS

International Searching Authority, International Search Report and Written Opinion received for International Application No. PCT/SE2022/050386, dated Jun. 2, 2022, 17 pages, Swedish Patent and Registration Office, Sweden.

* cited by examiner

ELECTRONIC COUNTERMEASURE CARTRIDGE ARRANGED TO BE LOADED INTO COUNTERMEASURE DISPENSER AND ARRANGED TO IRRADIATE DISPENSED ELECTROMAGNETICALLY REFLECTIVE MATERIAL

CROSS REFERENCE TO RELATED APPLICATIONS

This application is a National Stage Application, filed under 35 U.S.C. § 371, of International Application No. PCT/SE2022/050386, filed Apr. 21, 2022, which international application claims priority to and the benefit of Swedish Application No. 2100067-4, filed Apr. 26, 2021; the contents of both of which as are hereby incorporated by reference in their entireties.

TECHNICAL FIELD

The disclosure relates to an electronic countermeasure cartridge arranged to be loaded into a countermeasure dispenser in a mobile platform. The disclosure also relates to a method for providing threat protection for a platform and to a countermeasure system comprising a countermeasure dispenser.

BACKGROUND ART

Countermeasure dispensing systems for deploying countermeasures such as chaff and flares have been used for a long time to protect mobile platforms such as aircraft in response to threats such as radar seeking and heat seeking missiles that are launched towards the mobile platform. Traditionally, the countermeasures were dispensed directly from the platform in order to provide a greater radar or heat signature than the platform itself to direct the incoming threat onto the countermeasure signature.

Development of threat guidance such as increased use of more radar bands for targeting have made it difficult to provide a single efficient countermeasure. This problem is as an example solved by electronic active decoys (EADs) that are ejected from the platform. EADs can be used to create a false radar return or a false heat signature with physical separation from the target platform to imitate the radar or heat properties of the platform in order to divert the incoming threat to target the EAD instead of the platform. However, these decoys are expensive as they are dispensed as one-use decoys only. US 2016/0146580 A1 discloses one example of an EAD comprising digital radiofrequency memory based jammers.

Towed alternatives to dispensable EADs exist but require a separate signal-processing unit fitted in the platform to provide the towed decoy with instructions on how to operate in response to a threat. The separate signal-processing unit takes up space and adds weight to the platform that could be needed for other functions or reduce the total weight of the platform.

A further alternative is Directional Infrared Counter Measures (DIRCM) that targets the threat directly. This alternative is however expensive and requires separate installation on the platform.

There is thus a need for improvement within this area.

SUMMARY

An objective of this disclosure is to provide an electronic countermeasure cartridge, a method for providing threat protection for a platform and a countermeasure system comprising a countermeasure dispenser that addresses the problems described above. This object is achieved by the technical features contained in the characterizing portion of independent claims 1, 7 and 13. The dependent claims contain advantageous embodiments, further developments and variants of the method and system.

The disclosure relates to an electronic countermeasure cartridge wherein the electronic countermeasure cartridge comprises an electromagnetic transmitting means, an electric energy storage arranged to supply the electromagnetic transmitting means with electric energy and a trigger device arranged to trigger a transmission of electromagnetic radiation from the electromagnetic transmitting means. The transmitted electromagnetic radiation is arranged to irradiate an electromagnetically reflective material.

By including the required components that are needed to transmit electromagnetic radiation, i.e. an electromagnetic transmitting means and an energy storage within an electronic countermeasure cartridge, this electronic countermeasure cartridge can easily be loaded into an existing countermeasure dispenser within a platform without the need for additional adaptation of on-board systems and/or instrumentation or at least without extensive adaptation of on-board systems and/or instrumentation as the positions of the electronic countermeasure cartridges within a countermeasure dispenser can be arranged to be identified in the on-board systems and/or instrumentation such that they can be triggered individually as and when required. The platform's built-in threat detection and response systems interface with the countermeasure dispenser will feed the necessary information to the electronic countermeasure cartridge in order to send a trigger instruction to the trigger device. The trigger device in turn activates a transmission of electromagnetic radiation from the electromagnetic transmitting means.

The frequency of the electromagnetic radiation transmitted from the electromagnetic transmitting means is arranged to correspond to a dispensed electromagnetically reflective material. One advantage with the electronic countermeasure cartridge is that it is arranged to remain in the countermeasure dispenser throughout the operation of the platform. This means that the electronic countermeasure cartridge can be reused during operation of the platform as long as the energy storage is not depleted and for as long as the countermeasure dispenser contains electromagnetically reflective material that the electronic countermeasure cartridge can irradiate. It also means that once the platform has returned, the electronic countermeasure cartridge can be recharged and serviced to be reused. This greatly reduces the cost for the electronic countermeasure cartridge relative the expendable alternatives and reduces the need for installation of separate signal-processing units or other special installations.

The electronic countermeasure cartridge may have a size of 25.4 mm×25.4 mm×203.2 mm (1 inch×1 inch×8 inches) or a size of 50.8 mm×25.4 mm×203.2 mm (2 inches×1 inch×8 inches). These sizes correspond to the standard sizes for countermeasure cartridges used today and thereby makes the electronic countermeasure cartridge fit into existing equipment.

The electronic countermeasure cartridge may further comprise an electromagnetic receiving means arranged at a distance from the electromagnetic transmitting means arranged to receive electromagnetic radiation from threat guidance signals. In order to improve the efficiency of threat detection and to be able to adapt the platform's response to incoming threats, the electronic countermeasure cartridge may comprise an electromagnetic receiving means that is able to receive electromagnetic radiation from incoming threats. In this way, the frequency of the electromagnetic radiation to be transmitted in response to an updated threat assessment can be adapted to optimize the frequency of the transmitted electromagnetic radiation in response to the frequency of the threat guidance of the incoming threat or the type of threat guidance if several threats with different threat guidance has been launched towards the platform. The electromagnetic receiving means may be employed in addition to already existing threat guidance detection arranged in the platform to improve and/or complement the existing threat guidance detection. With threat guidance is meant a threat's targeting system that can be either active or passive. A threat's threat guidance can be an on-board system directing the threat or the threat can be directed by a system arranged in the platform from which the threat was fired.

The electromagnetic transmitting means may be arranged to transmit radiofrequency radiation, wherein the radiofrequency radiation is arranged to irradiate a radiofrequency reflective material. The electromagnetic transmitting means may be arranged to transmit optical radiation, wherein the optical radiation is arranged to irradiate an optically reflective material. The electromagnetic transmitting means can be arranged to operate in the frequency ranges most frequently employed by threats today. These are primarily in the radiofrequency range and in the optical range, including infrared and ultraviolet radiation. The reflective material dispensed from the countermeasure dispenser is adapted to be reflective to either of the two frequency ranges. As mentioned above, one electronic countermeasure cartridge may be arranged to transmit over a range of frequencies such that the transmitted frequency or frequency range can be optimized for an incoming threat.

The disclosure further relates to a method for providing threat protection for a platform. The method comprises:
providing a countermeasure dispenser in the platform,
arranging in the countermeasure dispenser, an electronic countermeasure cartridge comprising an electromagnetic transmitting means, an electric energy storage arranged to supply the electromagnetic transmitting means with electric energy and a trigger device arranged to trigger a transmission of electromagnetic radiation from the electromagnetic transmitting means, wherein the transmitted electromagnetic radiation is arranged to irradiate an electromagnetically reflective material,
arranging in the countermeasure dispenser, a reflective material countermeasure cartridge comprising an electromagnetically reflective material, wherein in response to a threat, the method comprises:
dispensing the electromagnetically reflective material,
triggering the transmission of electromagnetic radiation from the electromagnetic transmitting means onto the dispensed electromagnetically reflective material.

As described with the electronic countermeasure cartridge, a method for providing threat protection where an electronic countermeasure cartridge is used together with an electromagnetically reflective material dispensed from the same countermeasure dispenser will provide a cost-efficient and effective means of protection. The electronic countermeasure cartridge is arranged to remain in the countermeasure dispenser throughout operation of the platform.

The electromagnetic transmitting means may be arranged to transmit radiofrequency radiation, wherein the method comprises:
dispensing radiofrequency reflective material arranged to reflect radiofrequency radiation,
triggering the transmission of radiofrequency radiation from the electromagnetic transmitting means onto the dispensed radiofrequency reflective material.

The electromagnetic transmitting means may be arranged to transmit optical radiation, wherein the method comprises:
dispensing optically reflective material arranged to reflect optical radiation transmitted from the electromagnetic transmitting means,
triggering the transmission of optical radiation from the electromagnetic transmitting means onto the dispensed optically reflective material.

The advantages are the same as described above.

The method may comprise:
arranging a multitude of electronic countermeasure cartridges arranged in the countermeasure dispenser. In order to cover a broader range of the electromagnetic spectrum or to provide protection from both radiofrequency and optical-based threats, more than one electronic countermeasure cartridge can be loaded into the countermeasure dispenser.

The method may comprise:
arranging each electronic countermeasure cartridge to transmit radiofrequency radiation or optical radiation within different wavelength intervals. In this way, the threat protection can be made versatile in response to the various threats that is expected to be encountered.

The method may comprise:
triggering the electronic countermeasure cartridges selectively, simultaneously or in sequence. To counter an incoming threat or several incoming threats most efficiently, individual electronic countermeasure cartridge can be triggered selectively depending on which threat or threats have been identified. In order to provide an increase in transmission strength or to transmit a broadband signal, several electronic countermeasure cartridges can be fired simultaneously. If needed, several electronic countermeasure cartridges can be fired in sequence to extend the irradiation of the electromagnetically reflective material or to irradiate separate dispensed electromagnetically reflective material with the same or different reflective properties.

The method may comprise:
adapting the frequency of the transmitted electromagnetic radiation in response to an updated threat assessment. In response to an updated threat assessment, for instance by detecting if an incoming threat is based on a different radiofrequency band or optical band, the frequency of the transmitted radiation can be adapted and the electromagnetically reflective material can thus be irradiated with electromagnetic radiation of different frequencies.

The method may comprise:
providing an electromagnetic receiving means arranged at a distance from the electromagnetic transmitting means arranged to receive electromagnetic radiation from threat guidance signals. By providing the electronic countermeasure cartridge with an electromagnetic receiving means arranged at a distance from the electromagnetic transmitting means arranged to receive electromagnetic radiation from threat guidance signals, the efficiency of threat detection can be improved. This allows the electronic countermeasure cartridge to be able to adapt the response to incoming threats, by that the electromagnetic receiving means is able to receive electromagnetic radiation from incoming threats. In this way, the frequency of the electromagnetic radiation to be transmitted in response to an updated threat assessment can be adapted to optimize the frequency of the transmitted electromagnetic radiation in response to the electromagnetic characteristics of the incoming threat. The electromagnetic receiving means may be employed to complement or to be in addition to already existing threat guidance detection arranged in the platform.

The disclosure also relates to a countermeasure system comprising a countermeasure dispenser arranged in a platform, an electronic countermeasure cartridge comprising an electromagnetic transmitting means, an energy storage arranged to supply the electromagnetic transmitting means with energy, a trigger device arranged to trigger a transmission of the electromagnetic transmitting means and a reflective material countermeasure cartridge comprising an electromagnetically reflective material arranged in the countermeasure dispenser. The electronic countermeasure cartridge is arranged in the countermeasure dispenser, and the system is, in response to a threat, configured for:
dispensing the electromagnetically reflective material,
triggering the transmission of electromagnetic radiation from the electromagnetic transmitting means onto the dispensed electromagnetically reflective material.

A system comprising an electronic countermeasure cartridge arranged in a countermeasure dispenser in a platform together with a reflective material countermeasure cartridge comprising an electromagnetically reflective material will provide a versatile countermeasure system that can be easily adaptable and that does not rely on dispensing expensive EADs. Instead, the electronic countermeasure cartridge is arranged to remain in the countermeasure dispenser throughout the entire operation of the platform in which the countermeasure dispenser is installed. Only the reflective material dispenser cartridges comprising electromagnetically reflective material will have to be replaced.

The system may comprise a multitude of electronic countermeasure cartridges arranged in the countermeasure dispenser. In order to cover a broader range of the electromagnetic spectrum or to provide protection from both radiofrequency and optical-based threats, more than one electronic countermeasure cartridge capable of transmitting electromagnetic radiation in different parts of the electromagnetic spectrum can be loaded into the countermeasure dispenser.

The system may be configured for:
arranging each electronic countermeasure cartridge to transmit electromagnetic radiation within different wavelength intervals. In this way, the threat protection can be made versatile in response to the various threats that can be encountered.

The system may be configured for:
triggering the electronic countermeasure cartridges selectively, simultaneously or in sequence.

In order to counter an incoming threat or several incoming threats most efficiently, individual electronic countermeasure cartridge can be triggered selectively depending on which threat or threats have been identified. In order to provide an increase in transmission strength or to transmit a broadband signal, several electronic countermeasure cartridges can be fired simultaneously. If needed, several electronic countermeasure cartridges can be fired in sequence to extend the irradiation of the electromagnetically reflective material or to irradiate separate dispensed electromagnetically reflective material with the same or different reflective properties.

The system be configured for:
adapting the frequency of the transmitted electromagnetic radiation in response to an updated threat assessment. In response to an updated threat assessment, for instance by detecting if the incoming threat is based on a different radiofrequency band or optical band, the frequency of the transmitted radiation can be adapted and the electromagnetically reflective material can thus be irradiated with electromagnetic radiation of different frequencies.

One or more electronic countermeasure cartridges may further comprise an electromagnetic receiver arranged at a distance from the electromagnetic transmitting means arranged to receive electromagnetic radiation from threat guidance signals. By providing the electronic countermeasure cartridge with an electromagnetic receiving means arranged at a distance from the electromagnetic transmitting means arranged to receive electromagnetic radiation from threat guidance signals, the efficiency of threat detection can be improved. This allows the electronic countermeasure cartridge to be able to adapt the response to incoming threats, by that the electromagnetic receiving means is able to receive electromagnetic radiation from incoming threats. In this way, the frequency of the electromagnetic radiation to be transmitted in response to an updated threat assessment can be adapted to optimize the frequency of the transmitted electromagnetic radiation in response to the electromagnetic characteristics of the incoming threat. The electromagnetic receiving means may be employed to complement or to be in addition to already existing threat guidance detection arranged in the platform.

DETAILED DESCRIPTION

Figure 1:
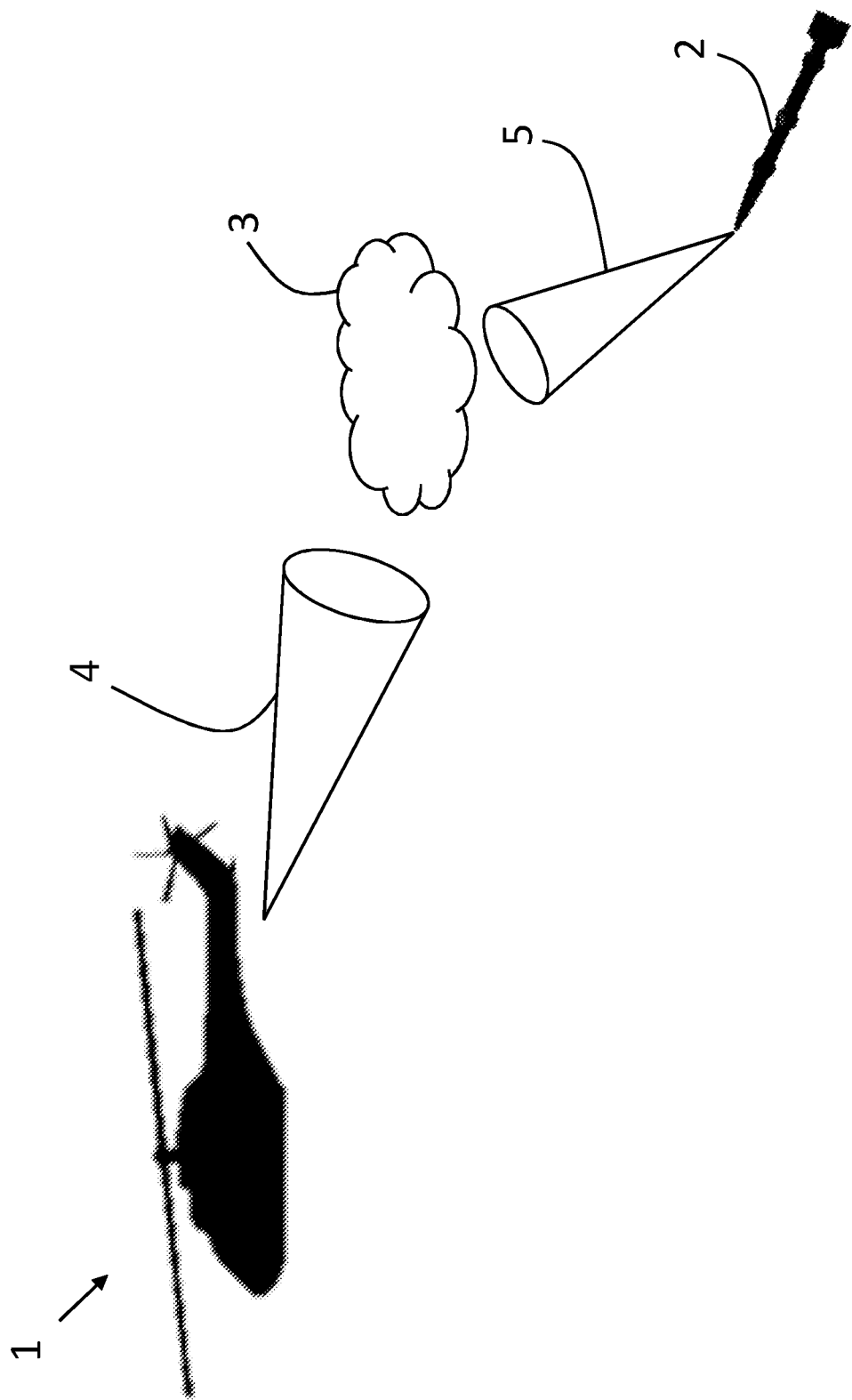
FIG. 1 schematically shows an overview of a platform employing a system according to the disclosure, FIG. 2 schematically shows an electronic countermeasure cartridge according to an example embodiment of the disclosure, FIG. 3 schematically shows an electronic countermeasure cartridge according to a further example embodiment of the disclosure.

FIG. 1 schematically shows an overview of a platform 1 employing a system according to the disclosure. The platform 1 is in this example a helicopter, but the platform 1 may be any type of manned or unmanned aircraft. The platform 1 may alternatively also be a manned or unmanned ship or another surface vehicle. It is also possible for manned or unmanned land vehicles to utilize the system. The platform 1 comprises a NATO standard countermeasure dispenser known in the art today into which an electronic countermeasure cartridge comprising an electromagnetic transmitting means, an energy storage arranged to supply the electromagnetic transmitting means with energy and a trigger device arranged to trigger a transmission of the electromagnetic transmitting means is loaded. Further, at least one reflective material countermeasure cartridge comprising an electromagnetically reflective material is arranged in the countermeasure dispenser.

FIG. 1 schematically shows a threat 2 approaching the platform 1. In this example, the threat 2 is a missile. Threats can also comprise tube-dispensed, optically tracked, wire-guided missiles (TOWS), rocket propelled grenades (RPGs), surface-to-air missiles (SAMs), surface-to-surface missiles (SSMs), man-portable air-defence systems (MANPADS or MPADS) and similar aerial weapons.

The threat's 2 threat guidance seeks out either a radiofrequency signature or an optical signature of the platform 1 in order to damage or destroy the platform 1. In the context of this application, an optical signature could be an infrared signature, a visible signature or an ultraviolet signature. When the threat 2 and the type of threat guidance used is detected by a threat detection system on-board the platform 1, the on-board systems, automatically or manually operated, respond to the threat 2 by dispensing an electromagnetically reflective material 3 from one or more reflective material countermeasure cartridges that is reflective to electromagnetic radiation having a frequency corresponding to the frequency of the detected threat guidance. The on-board systems also trigger the transmission of electromagnetic radiation from the electromagnetic transmitting means onto the dispensed electromagnetically reflective material 3 with a frequency that corresponds to the threat guidance of the incoming threat 2.

Examples of electromagnetically reflective materials 3 dispensed from the reflective material countermeasure cartridges are chaff of different sizes to match the transmitted radiofrequency radiation of the electronic countermeasure dispenser or smoke-screening agents or other easily dispersible particles that are able to reflect optical radiation.

In FIG. 1, the platform 1 has dispensed an electromagnetically reflective material 3, which has dispersed into a cloud-like structure, and the electromagnetic transmitting means of the electronic countermeasure cartridge has started to irradiate the electromagnetically reflective material 3 with electromagnetic radiation with a frequency corresponding to the detected threat guidance. This is illustrated by a first radiation cone 4 originating from the electronic countermeasure dispenser (not shown). The threat 2 has a threat guidance cone 5 directed towards the cloud-like structure of electromagnetically reflective material 3, indicating that the system according to the disclosure has been able to provide a larger detection signature by means of the electromagnetically reflective material 3 than the platform's 1 signature. The threat guidance cone 5 is intended to illustrate the threat's 2 targeting means, such as an electromagnetic targeting means, e.g. radiofrequency targeting, infrared targeting or ultraviolet targeting. This leads to that the threat 2 will approach the electromagnetically reflective material 3 instead of the platform 1. The platform 1 is thereby protected from the threat 2.

Figure 2:
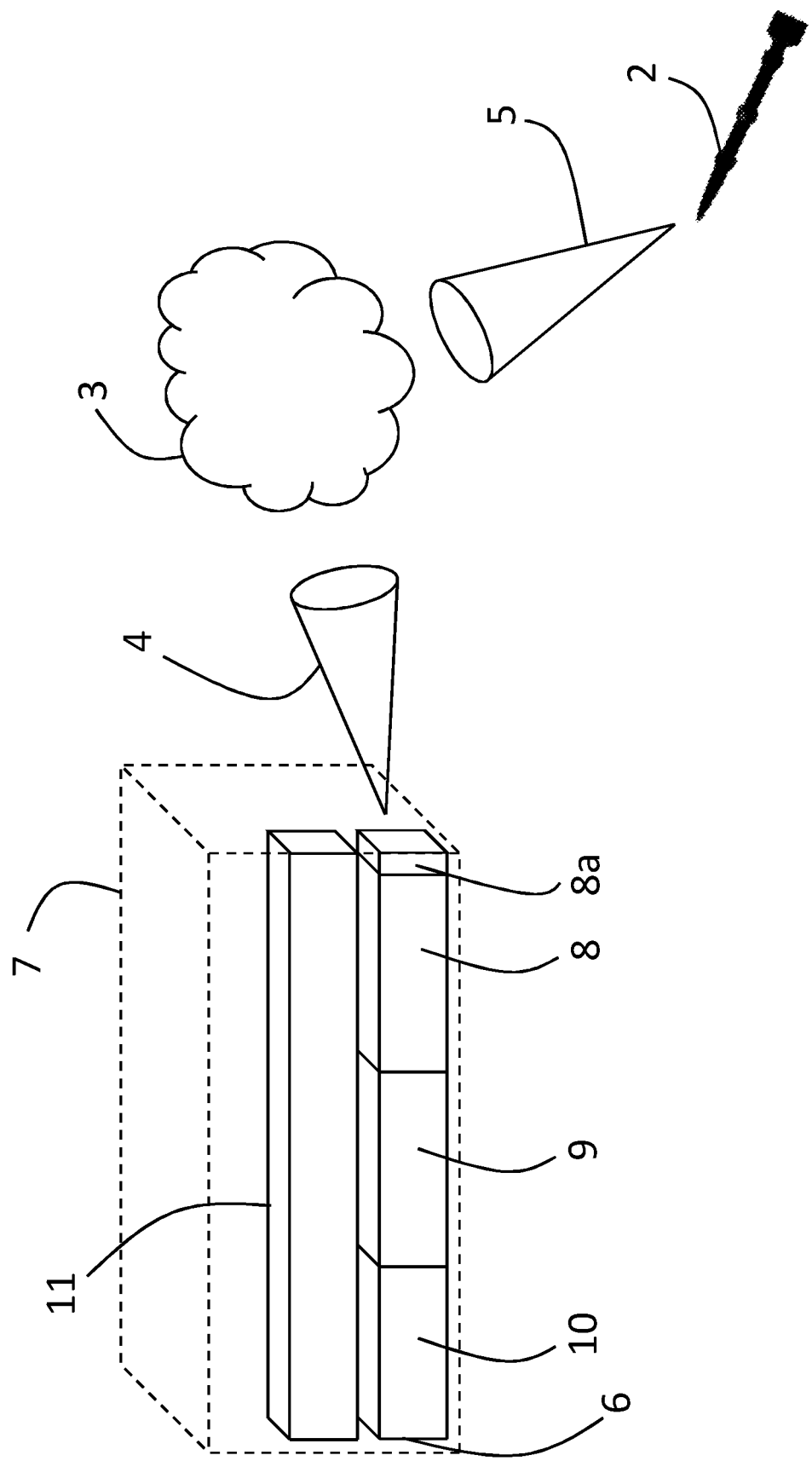

FIG. 2 schematically shows an electronic countermeasure cartridge 6 according to an example embodiment of the disclosure. As mentioned, the electronic countermeasure cartridge 6 is arranged to be loaded into a countermeasure dispenser 7 in a mobile platform (not shown in this figure), such as the one in FIG. 1. In the figures, the countermeasure dispenser 7 is schematically illustrated with dashed lines. The electronic countermeasure cartridge 6 comprises an electromagnetic transmitting means 8 arranged to transmit radiofrequency or optical radiation, an electric energy storage 9 arranged to supply the electromagnetic transmitting means 8 with electric energy and a trigger device 10 arranged to trigger a transmission of electromagnetic radiation from the electromagnetic transmitting means 8 upon detection of an incoming threat 2. The trigger device 10 is arranged to be compatible with today's countermeasure dispenser interfaces such that no or only minor changes needs to be made to the countermeasure dispenser and/or the on-board control systems. The electronic countermeasure cartridge 6 is arranged to remain in the countermeasure dispenser 7 when the trigger device 10 is triggered and can be reused until the electric energy storage 9 is depleted. The electromagnetic transmitting means 8 is for instance a radiofrequency wave-generating device or an optical wave-generating device as known in the art. The electromagnetic transmitting means 8 is connected to an antenna or lens 8*a* that provides the necessary shaping of or focus of the transmitted electromagnetic radiation.

FIG. 2 also schematically shows a reflective material countermeasure cartridge 11 comprising an electromagnetically reflective material 3, which has been dispensed into a cloud-like shape. The transmitted electromagnetic radiation transmitted from the electronic countermeasure cartridge 6 is arranged to irradiate the electromagnetically reflective material 3 dispensed from the reflective material countermeasure cartridge 11 in the countermeasure dispenser 7 as illustrated by the first radiation cone 4. The triggering of the dispensing of the electromagnetically reflective material 3 can be made prior to the triggering of the transmission of electromagnetic radiation from the electronic countermeasure cartridge 6, at the same time as the triggering of the transmission of electromagnetic radiation from the electronic countermeasure cartridge 6 or after the triggering of the transmission of electromagnetic radiation from the electronic countermeasure cartridge 6, depending on the situation.

Examples of electromagnetic transmitting means 8 are radiation generating electronic circuits known today connected to antennae and/or lenses depending on the type of electromagnetic radiation that is to be transmitted. Examples of electric energy storages 9 are batteries that can be charged before the platform starts its operation and/or that can be charged by the platform itself during operation. Examples of trigger devices 10 are circuit boards that are arranged to initiate the transmission of electromagnetic radiation from the electromagnetic transmitting means 8 upon receipt of a trigger instruction from the on-board systems.

In FIG. 2, the electronic countermeasure cartridge 6 has a size of 25.4 mm×25.4 mm×203.2 mm (1 inch×1 inch×8 inches) so that it will fit into NATO standard countermeasure dispensers.

Figure 3:
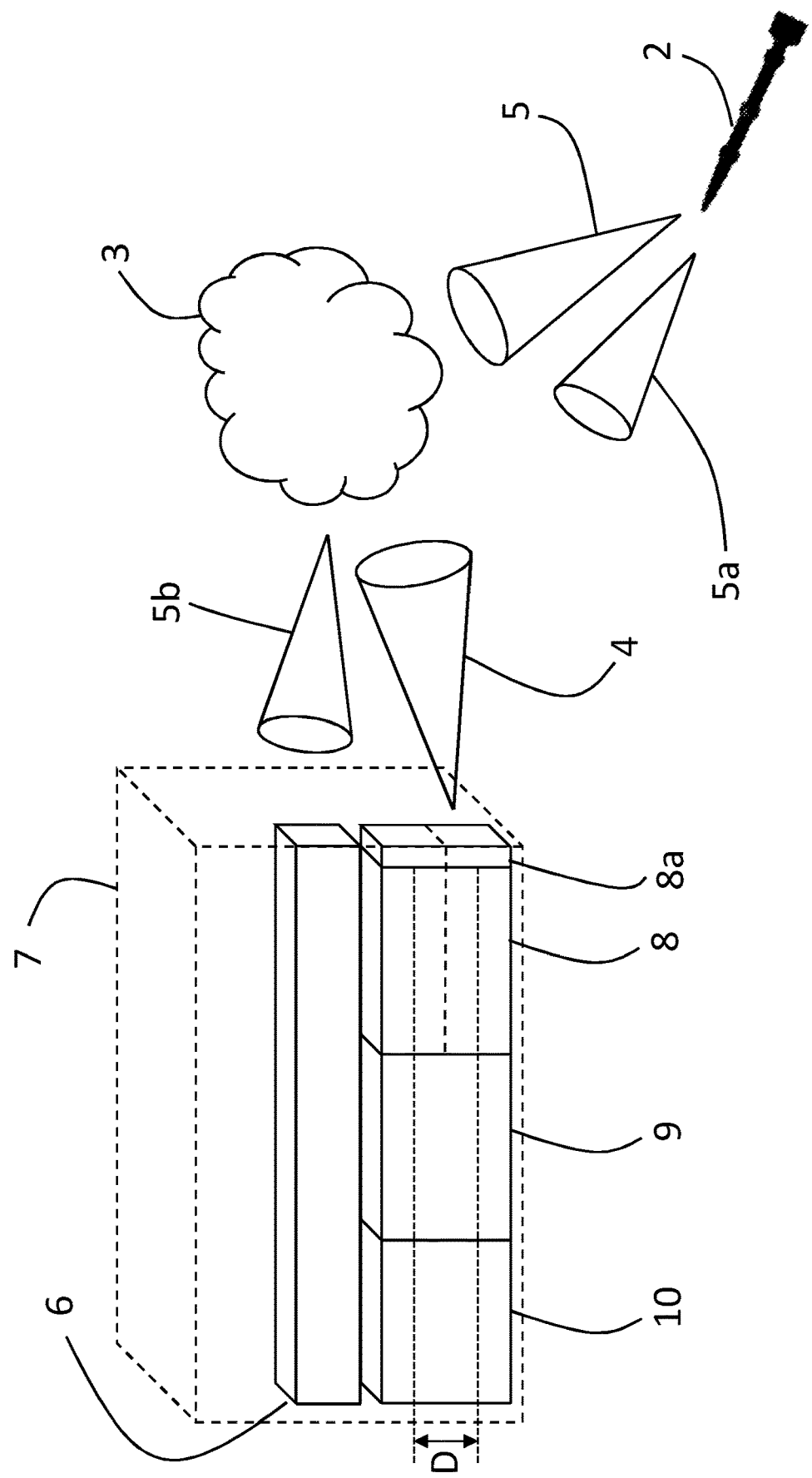

FIG. 3 schematically shows an electronic countermeasure cartridge 6 according to a further example embodiment of the disclosure. The difference between the electronic countermeasure cartridge 6 in FIG. 3 and the one in FIG. 2 is that the electronic countermeasure cartridge 6 in FIG. 3 has a size of 50.8 mm×25.4 mm×203.2 mm (2 inches×1 inch×8 inches) which is also a NATO standard size for countermeasure cartridges.

The electronic countermeasure cartridge 6 may further comprise an electromagnetic receiving means 12 arranged at a distance D from the electromagnetic transmitting means 8. This is illustrated in the figure as measured from a centre of the electromagnetic transmitting means 8 to a centre of the electromagnetic receiving means 12. In the example of FIG. 3, the distance is essentially 25.4 mm (1 inch). The electromagnetic receiving means 12 is arranged to receive electromagnetic radiation from threat guidance signals from the incoming threat 2 in order to determine the type of electromagnetic radiation that the threat 2 is guided by and thereby provide information to the system on how to adapt the frequency of the transmitted electromagnetic radiation from the electronic countermeasure cartridge 6 in response to a threat assessment. Such electromagnetic receiving means are known in the art and can be adapted to provide necessary information to the platform's on-board systems and/or to the electromagnetic transmitting means 8. In FIG. 3, the electromagnetic radiation from active threat guidance signals is illustrated by threat guidance cone 5a, illustrating direct radiation from the threat guidance signals of threat 2 and by threat guidance cone 5b, illustrating indirect radiation from the threat guidance signals of threat 2 that is reflected from the electromagnetically reflective material 3.

The threat assessment may be continuously updated in response to further received threat guidance signals. This leads to that the frequency of the transmitted electromagnetic radiation from the electronic countermeasure cartridge 6 may be changed. This can for instance be done by built-in circuitry within the electromagnetic transmitting means 8, which can change the frequency of the transmitted electromagnetic radiation, one example being Digital Radio Frequency Memory (DRFM). This is done within the limitations of the electromagnetic radiation frequencies the electromagnetic transmitting means 8 is capable of transmitting. If it is determined that the frequency needed to irradiate the electromagnetically reflective material 3 lies outside what is possible for the electronic countermeasure cartridge 6 to transmit, one or more further electronic countermeasure cartridges 6 (not shown) installed in the countermeasure dispenser 7 can be triggered to transmit electromagnetic radiation instead. Additionally, further electromagnetically reflective material 3 may be dispensed from additional reflective material countermeasure cartridges 11 with a size that better reflects the updated transmitted electromagnetic radiation.

The 50.8 mm×25.4 mm×203.2 mm (2 inches×1 inch×8 inches) size allows scalability of the system if more transmitted power from the electronic countermeasure cartridge 6 is needed or if more separation between the receiving and transmitting means are needed. Thus, the electronic countermeasure cartridge 6 of FIG. 2 may also be equipped with an electromagnetic receiving means 12 arranged at a distance from the electromagnetic transmitting means 8, functioning in the same way as described above.

The layout of the electronic countermeasure cartridge 6 shown in FIGS. 2 and 3 are only meant for illustration and should not be seen as limiting to the interior design of the electronic countermeasure cartridge 6. The different parts of the electronic countermeasure cartridge 6 can have different arrangements and can extend over the entire length of the electronic countermeasure cartridge 6 instead of being separated into blocks as illustrated in the figures or can be made into a single component where each of the electromagnetic transmitting means 8, electric energy storage 9 and trigger device 10 is integrated.

As will be realised, the described electronic countermeasure dispenser, method and system are capable of modification in various obvious respects, all without departing from the scope of the appended claims. Accordingly, the drawings and the description are to be regarded as illustrative in nature, and not restrictive.

The invention claimed is:

1. Electronic countermeasure cartridge (6) arranged to be loaded into a countermeasure dispenser (7) in a mobile platform (1), characterized in that the electronic countermeasure cartridge (6) comprises an electromagnetic transmitting means (8), an electric energy storage (9) arranged to supply the electromagnetic transmitting means (8) with electric energy and a trigger device (10) arranged to trigger a transmission of electromagnetic radiation from the electromagnetic transmitting means (8) upon detection of an incoming threat (2), wherein the transmitted electromagnetic radiation is arranged to irradiate an electromagnetically reflective material (3) dispensed from at least one reflective material countermeasure cartridge comprising an electromagnetically reflective material arranged in the countermeasure dispenser (7).

2. Electronic countermeasure cartridge (6) according to claim 1, wherein the electronic countermeasure cartridge (6) has a size of 25.4 mm×25.4 mm×203.2 mm (1 inch×1 inch×8 inches).

3. Electronic countermeasure cartridge (6) according to claim 1, wherein the electronic countermeasure cartridge (6) has a size of 50.8 mm×25.4 mm×203.2 mm (2 inches×1 inch×8 inches).

4. Electronic countermeasure cartridge (6) according to claim 3, wherein the electronic countermeasure cartridge (6) further comprises an electromagnetic receiving means (12) arranged at a distance (D) from the electromagnetic transmitting means (8) arranged to receive electromagnetic radiation from threat guidance signals.

5. Electronic countermeasure cartridge (6) according to claim 1, wherein the electromagnetic transmitting means (8) is arranged to transmit radiofrequency radiation, wherein the radiofrequency radiation is arranged to irradiate the electromagnetically reflective material (3).

6. Electronic countermeasure cartridge (6) according to claim 1, wherein the electromagnetic transmitting means (8) is arranged to transmit optical radiation, wherein the optical radiation is arranged to irradiate the optically reflective material.

7. Method for providing threat protection for a platform (1), wherein the method comprises:
providing a countermeasure dispenser (7) in the platform (1),
arranging in the countermeasure dispenser (7), an electronic countermeasure cartridge (6) comprising an electromagnetic transmitting means (8), an electric energy storage (9) arranged to supply the electromagnetic transmitting means (8) with electric energy and a trigger device (10) arranged to trigger a transmission of electromagnetic radiation from the electromagnetic transmitting means (8), wherein the transmitted electromagnetic radiation is arranged to irradiate an electromagnetically reflective material (3),
arranging in the countermeasure dispenser (7), a reflective material countermeasure cartridge (11) comprising an electromagnetically reflective material (3), wherein in response to a threat (2), the method comprises:
dispensing the electromagnetically reflective material (3),
triggering the transmission of electromagnetic radiation from the electromagnetic transmitting means (8) onto the dispensed electromagnetically reflective material (3).

8. Method according to claim 7, wherein the electromagnetic transmitting means (8) is arranged to transmit radiofrequency radiation, wherein the method comprises:
dispensing electromagnetically reflective material (3) arranged to reflect radiofrequency radiation,
triggering the transmission of radiofrequency radiation from the electromagnetic transmitting means (8) onto the dispensed electromagnetically reflective material (3).

9. Method according to claim 7, wherein the electromagnetic transmitting means (8) is arranged to transmit optical radiation, wherein the method comprises:
dispensing optically reflective material arranged to reflect optical radiation transmitted from the electromagnetic transmitting means (8), triggering the transmission of optical radiation from the electromagnetic transmitting means (8) onto the dispensed optically reflective material.

10. Method according to claim 7, wherein the method comprises:
arranging a multitude of electronic countermeasure cartridges (6) arranged in the countermeasure dispenser (7).

11. Method according to claim 10, wherein the method comprises:
arranging each electronic countermeasure cartridge (6) to transmit radiofrequency radiation or optical radiation within different wavelength intervals.

12. Method according to claim 10, wherein the method comprises:
triggering the electronic countermeasure cartridges (6) selectively, simultaneously or in sequence.

13. Method according to claim 7, wherein the method comprises:
adapting the frequency of the transmitted electromagnetic radiation in response to an updated threat assessment.

14. Method according to claim 7, wherein the method comprises:
providing an electromagnetic receiving means (12) arranged at a distance (D) from the electromagnetic transmitting means (8) arranged to receive electromagnetic radiation from threat guidance signals.

15. Countermeasure system comprising a countermeasure dispenser (7) arranged in a platform (1), an electronic countermeasure cartridge (6) comprising an electromagnetic transmitting means (8), an electric energy storage (9) arranged to supply the electromagnetic transmitting means (8) with energy, a trigger device (10) arranged to trigger a transmission of the electromagnetic transmitting means (8) and a reflective material countermeasure cartridge (11) comprising an electromagnetically reflective material (3) arranged in the countermeasure dispenser (7), wherein the electronic countermeasure cartridge (6) is arranged in the countermeasure dispenser (7), wherein the system is, in response to a threat (2), configured for:
dispensing the electromagnetically reflective material (3),
triggering the transmission of electromagnetic radiation from the electromagnetic transmitting means (8) onto the dispensed electromagnetically reflective material (3).

16. Countermeasure system according to claim 15, wherein the system is configured for:
arranging a multitude of electronic countermeasure cartridges (6) in the countermeasure dispenser (7).

17. Countermeasure system according to claim 16, wherein the system is configured for:
arranging each electronic countermeasure cartridge (6) to transmit electromagnetic radiation within different wavelength intervals.

18. Countermeasure system according to claim 16, wherein the system is configured for:
triggering the electronic countermeasure cartridges (6) selectively, simultaneously or in sequence.

19. Countermeasure system according to claim 15, wherein the system is configured for:
adapting the frequency of the transmitted electromagnetic radiation in response to an updated threat assessment.

20. Countermeasure system according to claim 15, wherein one or more electronic countermeasure cartridges (6) further comprises an electromagnetic receiver arranged at a distance (D) from the electromagnetic transmitting means (8) arranged to receive electromagnetic radiation from threat guidance signals.

\* \* \* \* \*